US010392270B2

(12) United States Patent
Swaminathan et al.

(10) Patent No.: US 10,392,270 B2
(45) Date of Patent: Aug. 27, 2019

(54) MULTI-EFFECT MEMBRANE DISTILLATION

(71) Applicant: Massachusetts Institute of Technology, Cambridge, MA (US)

(72) Inventors: Jaichander Swaminathan, Cambridge, MA (US); Ronan K. McGovern, Cambridge, MA (US); Hyung-Won Chung, Cambridge, MA (US); David Elan-Martin Warsinger, Potomac, MD (US); John H. Lienhard, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 287 days.

(21) Appl. No.: 15/211,424

(22) Filed: Jul. 15, 2016

(65) Prior Publication Data

US 2017/0014773 A1 Jan. 19, 2017

Related U.S. Application Data

(60) Provisional application No. 62/193,748, filed on Jul. 17, 2015.

(51) Int. Cl.
*B01D 3/14* (2006.01)
*B01D 61/36* (2006.01)
(Continued)

(52) U.S. Cl.
CPC .............. *C02F 1/447* (2013.01); *B01D 3/146* (2013.01); *B01D 61/36* (2013.01); *B01D 61/364* (2013.01);
(Continued)

(58) Field of Classification Search
CPC .... C02F 1/04; C02F 1/048; C02F 1/44; C02F 1/447; C02F 1/448; C02F 2301/08;
(Continued)

(56) References Cited

U.S. PATENT DOCUMENTS 4,818,345 A 4/1989 Jonsson
6,716,355 B1 4/2004 Hanemaaijer et al.
(Continued)

FOREIGN PATENT DOCUMENTS

WO 2014164255 A1 10/2014

OTHER PUBLICATIONS

Zhao, K., et al., "Experimental study of the memsys vacuum-multi-effect-membrane-distillation (V-MEMD) module", Desalination, 323, pp. 150-160 (2013).*
(Continued)

*Primary Examiner* — Benjamin L Lebron
(74) *Attorney, Agent, or Firm* — Modern Times Legal; Robert J. Sayre

(57) ABSTRACT

A multi-effect membrane distillation system includes first and second membrane distillation effects. Each effect (stage) includes a feed channel, a gap, and a vapor-permeable membrane separating the feed channel from the gap. A liquid feed is fed into the feed channel of the first effect via a feed inlet, and the liquid feed is extracted from the first-stage feed channel via a first feed-transfer conduit that delivers the liquid feed to the second-stage feed channel. The feed is extracted from the second-stage feed channel via a second feed-transfer conduit. At least one permeate-extraction conduit is coupled with the first-stage and second-stage gaps and is configured to extract permeate (e.g., pure water) therefrom.

28 Claims, 5 Drawing Sheets

(51) Int. Cl.
  *C02F 1/04* (2006.01)
  *C02F 1/44* (2006.01)
  *C02F 103/08* (2006.01)

(52) U.S. Cl.
  CPC .............. *B01D 61/366* (2013.01); *C02F 1/04* (2013.01); *C02F 1/44* (2013.01); *B01D 2313/38* (2013.01); *B01D 2317/022* (2013.01); *B01D 2319/06* (2013.01); *B01D 2325/36* (2013.01); *B01D 2325/38* (2013.01); *C02F 1/048* (2013.01); *C02F 2103/08* (2013.01); *C02F 2201/002* (2013.01); *C02F 2301/08* (2013.01); *C02F 2303/10* (2013.01); *Y02W 10/30* (2015.05)

(58) Field of Classification Search
  CPC .............. C02F 2303/10; C02F 2209/03; C02F 2103/08; C02F 2201/002; B01D 61/36; B01D 61/364; B01D 63/10; B01D 63/02; B01D 63/043; B01D 63/046; B01D 63/026; B01D 63/082; B01D 2313/38; B01D 2313/24; B01D 2313/143; B01D 2317/022; B01D 2319/04; B01D 2319/06; B01D 1/0035; B01D 1/2881; B01D 5/0012; B01D 5/006; B01D 5/0072; B01D 5/0058; B01D 3/146; B01D 61/366; B01D 2325/36; B01D 2325/38; Y02W 10/30
  See application file for complete search history.

(56) References Cited

U.S. PATENT DOCUMENTS

2013/0306560 A1* 11/2013 Deratani ............ B01D 67/0016
  210/650
2013/0319923 A1  12/2013 Heinzl
2014/0263060 A1*  9/2014 Summers ................ C02F 1/447
  210/640
2016/0074812 A1   3/2016 Lienhard et al.

OTHER PUBLICATIONS

Summers, E., et al., "Energy efficiency comparison of single-stage membrane distillation (MD) desalination cycles in different configurations", Desalination, 290, pp. 54-66 (2012).*
Geng, H., et al., "High water recovery of RO brine using multi-stage air gap membrane distillation", Desalination, 355, pp. 178-185 (2015). Available online Nov. 5, 2014.*
Winter, D., et al., "Desalination using membrane distillation: experimental studies on full scale spiral wound modules", Journal of Membrane Science, pp. 104-112 (2011).*
Raluy, R., et al., "Operational experience of a solar membrane distilation demonstration plant in Pozo Izquierdo-Gran Canaria Island (Spain)", Desalination, pp. 1-13 (2012).*
R. Raluy, et al., "Operational Experience of a Solar Membrane Distillation Demonstration Plant in Pozo Izquierdo-Gran Canaria Island (Spain)", 290 Desalination 1-13 (2012).
L. Francis, et al., "Material Gap Membrane Distillation: A New Design for Water Vapor Flux Enhancement," 448 Journal of Membrane Science 240-47 (2013).
USPTO, International Search Report and Written Opinion for PCT/US16/42571 (corresponding PCT Application) (dated Oct. 11, 2016).
A.M. Alklaibi, et al., "Transport Analysis of Air-Gap Membrane Distillation", 255 Journal of Membrane Science 239-253 (2005).
D. Warsinger, et al., "Effect of Module Inclination Angle on Air Gap Membrane Distillation", Proceedings of the 15th International Heat Transfer Conference, Kyoto, Japan (Aug. 2014).
L. Camacho, et al., "Advances in Membrane Distillation for Water Desalination and Purification Applications", 5 Water 94-196 (2013).
R.A. Harianto, et al., "Surface Treatment of Air Gap Membrane Distillation (AGMD) Condensation Plates: Techniques and Influences on Module Performances", 23 Applied Science and Convergence Technology 245-253 (2014).

* cited by examiner

MULTI-EFFECT MEMBRANE DISTILLATION

RELATED APPLICATION

This application claims the benefit of U.S. Provisional Application No. 62/193,748, filed 17 Jul. 2015, the entire content of which is incorporated herein by reference.

BACKGROUND

Membrane distillation for desalination involves the passage of hot salt water (as a liquid feed) over a microporous (e.g., having an average pore size of approximately 0.2 μm) hydrophobic membrane that allows pure water vapor through while retaining the dissolved salts in solution by establishing a temperature-driven vapor-pressure difference between the feed and permeate sides of the module. The hydrophobicity of the membrane ensures that liquid water does not pass through the membrane and thereby ensures nearly complete elimination of non-volatile impurities.

Depending on the design of the condensing/permeate system on the other side of the membrane, membrane distillation is categorized into various types, as described below.

In direct-contact membrane distillation (DCMD), a cold pure water stream flows on the other side (i.e., the permeate/condensate side) of the membrane from and counter-current to the feed; and the water vapor condenses into the cold pure water stream (transferring heat into the cold pure water stream) when the water vapor leaves the membrane. Because the hot and cold streams are separated only by a thin membrane, there is significant sensible heat transfer. This heat transfer, in addition to being a loss, also adds to temperature polarization in the streams. The heated pure water stream then passes through a heat exchanger where energy is transferred into the incoming feed to preheat it, thereby recovering part of the condensation energy.

In the case of air-gap membrane distillation (AGMD), there is an air gap across which the vapor diffuses before condensing on a heat-transfer plate maintained at a low temperature by a coolant stream. Consequently, sensible heat loss from the feed is reduced since air has a lower thermal conductivity. The evaporated water has to diffuse through the air gap and reach the film of condensate on the heat-transfer plate, which becomes one of the rate-limiting steps. A liquid feed is circulated via a pump and flows through respective channels on opposite sides of the membrane and the heat-transfer plate and is heated by a heater when passing from the first channel (where the liquid feed serves as a coolant via heat transfer through the heat-transfer plate) to the second channel, from which the pure water is removed from the heated feed water through the membrane. Pure water product is extracted from the bottom of the air gap, while the brine remaining from the liquid feed is extracted from the bottom of the second channel. In other embodiments, the pure water product is extracted from the top of the gap forcing the air gap to be flooded with water, forming a liquid gap. The gap usually contains a spacer material, typically made of non-conductive plastic to hold the membrane in place.

Permeate-gap membrane distillation (PGMD), where the gap is filled with condensate, without the high conductivity spacers has been suggested as a superior alternative to both air-gap (AGMD) and direct-contact (DCMD) configurations. Usually, the gaps in AGMD and PGMD systems have also used a spacer material, often made of plastic to hold the membrane in place.

Sweeping-gas membrane distillation (SGMD) utilizes an air stream that flows on the permeate side picking up the incoming vapor and becoming humidified as the stream moves along the module. Generally, the temperature of the air also increases along the module. The hot humid air is then cooled in a condenser where produced pure water is recovered.

Material-gap membrane distillation (MGMD) is a recent configuration where materials, such as sand, which have a low thermal conductivity (i.e., act as a thermal insulator), are used to fill the gap [see L. Francis, et al., "Material gap membrane distillation: A new design for water vapor flux enhancement," 448 Journal of Membrane Science 240-247 (2013)].

Other configurations include the vacuum membrane distillation (VMD) system, which has been adapted to produce a multi-stage configuration and is being marketed commercially by Memsys of Singapore and Germany [see Zhao, K., et al., "Experimental study of the Memsys vacuum-multi-effect-membrane-distillation (V-MEMD) module," *Desalination* 323 (2013): 150-160], and the conductive-gap membrane distillation (CGMD) system, wherein a thermally conductive material is mounted in the gap or the gap is made extremely thin with grooves or fins on the condensing surface to facilitate heat transfer across the gap.

SUMMARY

Apparatus and methods for multi-effect membrane distillation are described herein, where various embodiments of the apparatus and methods may include some or all of the elements, features and steps described below.

Embodiments of a multi-effect membrane distillation system can include a first membrane distillation effect, comprising a first-stage feed channel, a first-stage gap, and a first-stage vapor-permeable membrane separating the first-stage feed channel from the first-stage gap, a feed inlet. Also included is a first feed-transfer conduit, wherein the feed inlet and the first feed-transfer conduit are coupled with the first-stage feed channel and configured for flow of liquid feed from the feed inlet through the first-stage feed channel to the first feed-transfer conduit. The multi-effect membrane distillation system can also include a second membrane distillation effect, comprising a second-stage feed channel, a second-stage gap, and a second-stage vapor-permeable membrane separating the second-stage feed channel from the second-stage gap, a second feed-transfer conduit, and a heat-transfer plate separating the second-stage feed channel from the first-stage gap and configured to transfer heat there between. The first feed-transfer conduit and the second feed-transfer conduit are coupled with the second-stage feed channel and configured for flow of liquid feed from the first feed-transfer conduit through the second-stage feed channel to the second feed-transfer conduit. Also included is at least one permeate-extraction conduit coupled with the first-stage and second-stage gaps and configured to extract permeate therefrom.

In a method for distillation using the multi-effect membrane distillation system described herein, a liquid feed flows from the feed inlet and first feed-transfer conduit through the feed channels. A component of the liquid feed is vaporized through the vapor-permeable membranes into the gaps in each effect; and the vaporized component is condensed in the gaps.

Although first, second, third, etc., stages (or stages 1, 2, 3, etc.) are referenced herein, the stage numbering is used simply for convenience, and the stages can be located anywhere in the system (e.g., stages 1 and 2 need not be the first and second stages in the system and may, instead, be preceded by additional stages "upstream" from stages 1 and 2).

The system described herein involves stacking membrane distillation systems (e.g., CGMD, as described in U.S. Patent Application No. 62/050,334; AGMD; or PGMD systems) as effects to recover condensation energy between the effects and to evaporate more water by reusing this energy. Even though the following discussion is focused mainly on pure water production, this system can be applied to separate other more-volatile components from any mixture. Compared to CGMD and other single-stage MD configurations, the proposed system [with multi-effect membrane distillation (MMD)] is not restricted to producing only 10% of the incoming feed mass flow rate as pure water. The system has been modeled numerically, showing promise for high efficiency and recovery. Compared to single-stage configurations, the membrane thickness can be varied between the different effects, for example, by using thicker membranes at the later stages where the feed stream is more concentrated. This way, sensible heat conduction loss which is a significant problem at high feed salinity, can be reduced and overall energy efficiency can be improved.

Embodiments of the system can offer advantages compared to large-scale multi-stage flash (MSF) and multiple-effect distillation (MED) plants, as the amount of metal used in its construction can be much smaller and because it can be efficient in small-scale operation. The large systems also have several additional components to create and maintain low pressures, whereas no vacuum is needed in the system described herein.

The Memsys multi-stage vacuum MD systems also use a partial vacuum to be maintained in several channels. The construction cost for the designs described herein can be much lower, as no vacuum pumps or pressure channels are required because the system can be operated at or near ambient atmospheric pressure (e.g., at 1 atm or within 5, 10 or 50% of ambient atmospheric pressure). In particular embodiments, the gap in each effect can have a pressure within 10, 20, or 40% of the pressure in the feed channel in that effect. Where the pressure in the gap is reduced, the reduced pressure can be generated by, e.g., a vacuum pump or water column.

Compared to single-stage MD systems, the system described herein can achieve higher recovery ratios and may only need about half of the amount of pumping power, as cold-water pumping can be restricted to only the last stage.

Additionally, by matching the evaporation and condensation driving forces, a constant driving force for evaporation and condensation of the volatile component can be provided from the top to the bottom of each stage. The system also resists fouling, as no sitting tank is needed and overall residence time of high-salinity water is lower than in the case of recirculation systems.

Figures 1, 2, 3:
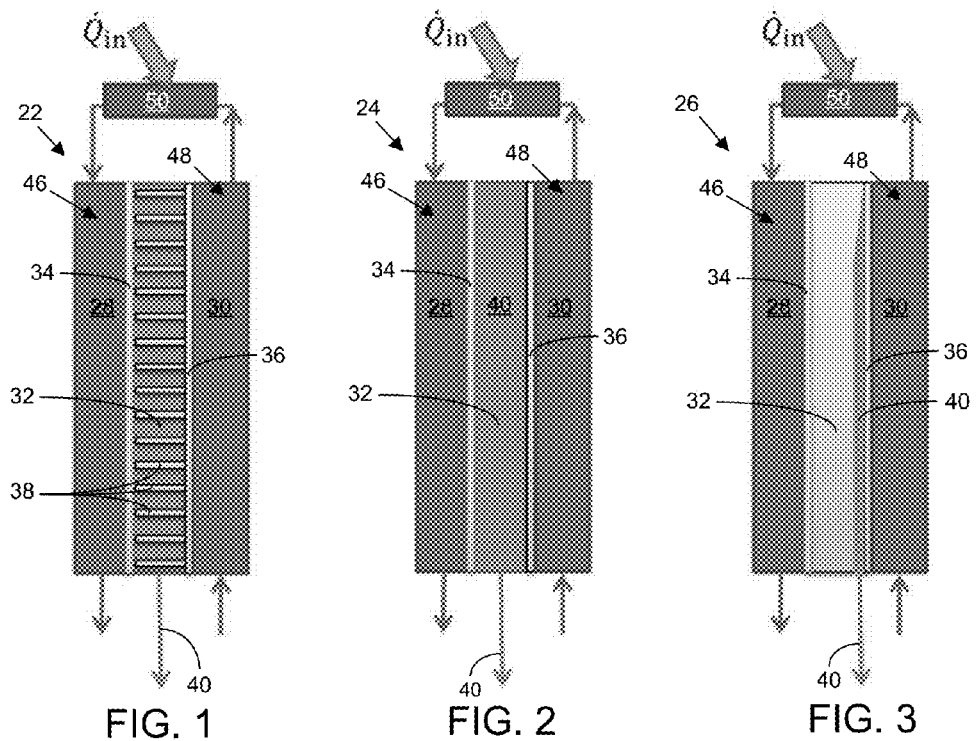
FIG. 1 is an illustration of a single-stage conductive-gap membrane distillation (CGMD) 22 configuration.
FIG. 2 is an illustration of single-stage permeate-gap membrane distillation (PGMD) 24 configuration.
FIG. 3 is an illustration of single-stage air-gap membrane distillation (AGMD) 26 configuration.

In the accompanying drawings, like reference characters refer to the same or similar parts throughout the different views. Superscript Roman numerals are used to differentiate multiple instances of the same or similar items sharing the same reference numeral or to designate the same component at different stages in a process. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at or near ambient pressure (e.g., about 50-120 kPa—for example, about 90-110 kPa) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Membrane distillation is used to separate the more-volatile component of a mixture through phase change. The main areas of its application include desalination, food processing, waste management and high purity water production for industrial applications. Due to its ability to use low feed temperatures, membrane distillation is well suited for harnessing renewable energy sources, such as solar and geothermal energy sources, and has seen much growth in off-grid remote desalination applications. The overall thermal desalination market is dominated by other large-scale multi-stage flash (MSF) or multi-effect distillation (MED) systems that produce millions of liters of water per day and that consume less energy per unit of desalinated water produced [characterized by a gained output ratio (GOR) in excess of 8]. The apparatus described herein shows promise for similar efficiencies with lower capital investments and with a much smaller footprint.

Permeate-gap membrane distillation (PGMD) without the high-conductivity spacers has been suggested as a superior alternative to both air-gap (AGMD) and direct contact (DCMD) configurations. Numerical modeling of the multi-effect conductive-gap membrane distillation system, described herein, shows that the proposed system can achieve a more-than-five-times-higher recovery ratio, while also achieving high GOR comparable to that of the large-scale systems discussed above.

Another commercial multi-staged MD system has been developed by Memsys, as described in US Application Publication No. 2013/0319923 A1. The apparatus described herein can achieve similar performance, in terms of recovery ratio, compared to the Memsys system, while not needing the vacuum pumps, thereby reducing capital costs.

Conventional single-stage MD configurations are illustrated in FIGS. 1-3, including a CGMD effect 22 shown in FIG. 1, a PGMD effect 24 shown in FIG. 2, and an AGMD effect 26 shown in FIG. 3. Each effect 22/24/26 includes a gap 32, a channel 46 filled with liquid feed 28 with a vapor-permeable membrane 34 (e.g., a membrane that selectively passes water, in vapor form, from the liquid feed through the membrane) interfacing with the gap 32, and a channel 48 filled with coolant 30, which can, in particular embodiments, be the liquid feed at a lower temperature after passing through the feed channel 16. A heat-transfer plate 36, onto which vapor that passes through the membrane 34 can condense, interfaces with an opposite side of the gap 32. In these embodiments, the coolant 30 flows up through the coolant channel 48 and then through a heater 50 before being fed as the liquid feed 28 through the feed channel 46.

Figure 4:
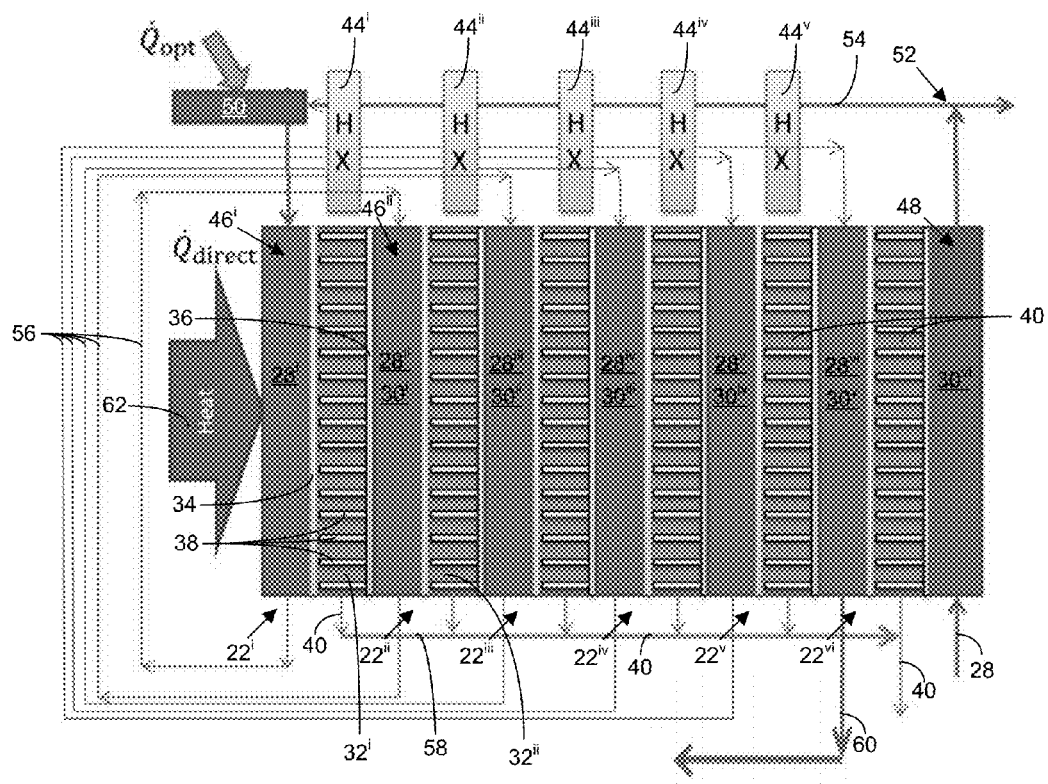
FIG. 4 is a schematic diagram of one embodiment of a multi-effect CGMD system with CGMD effects $22^{i}$-$22^{vi}$.

As shown in FIG. 4, a multi-effect system involves stacking a configuration of single-stage membrane distillation systems (here, in the form of a series of CGMD stages $22^i$-$22^{vi}$ in such a way that the feed $28^i$ from a first stage $22^i$ becomes both the cooling stream $30^i$ for the first stage $22^i$ and the feed $28^{ii}$ for the second stage $22^{ii}$. As a result, the feed $28^i$ in a first effect/stage $22^i$ ("effect" and "stage" are used interchangeably herein) is heated by condensation of vapor from the first effect/stage $22^i$ while simultaneously losing heat as water evaporates out of the feed $28^{ii}/30^i$ from a second effect/stage $22^{ii}$, condensing and transferring energy to the feed $28^{iii}/30^{ii}$ in the third effect/stage $22^{iii}$. As a result, heat is recovered into evaporating feed over multiple effects.

Various embodiments of the proposed multi-effect-MD (MMD) configurations are shown in FIGS. 4-7. In the multi-effect CGMD system of FIG. 4, a particular geometry of thermally conductive spacers 38 (here, in the form of fins extending from the conducting surface of the heat-transfer plate 36 into contact with the vapor-permeable membrane 34) is shown. Other methods of increasing the gap conductivity include using a spacer 38 in the form of a metal mesh, metallic wool, or another form of porous metal medium in the gap and in contact with the conducting surface. The material selected for the spacer 38 can advantageously be a corrosion-resistant composition, as the material may continuously be in contact with pure liquid water (where water is the permeate in the gap 32). Other relevant changes to the design include intermittently breaking the metal contact along the length of the module to reduce axial conduction effects. Although metals usually have high thermal conductivity, the composition of the spacer 38 is not limited to metal. Rather, the spacer 38 can be formed of nearly any conductive material as long as it can improve the effective thermal conductivity of the gap 32.

Figure 5:
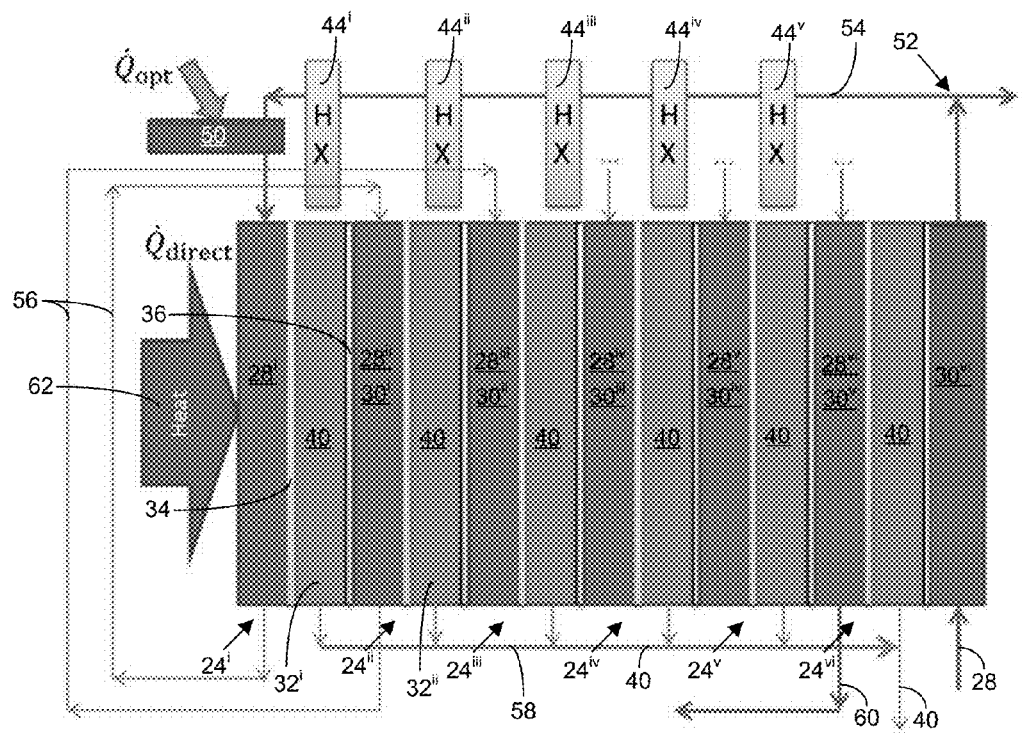
FIG. 5 is a schematic diagram of one embodiment of a multi-effect PGMD system with PGMD effects $24^{i}$-$24^{vi}$.
Figure 6:
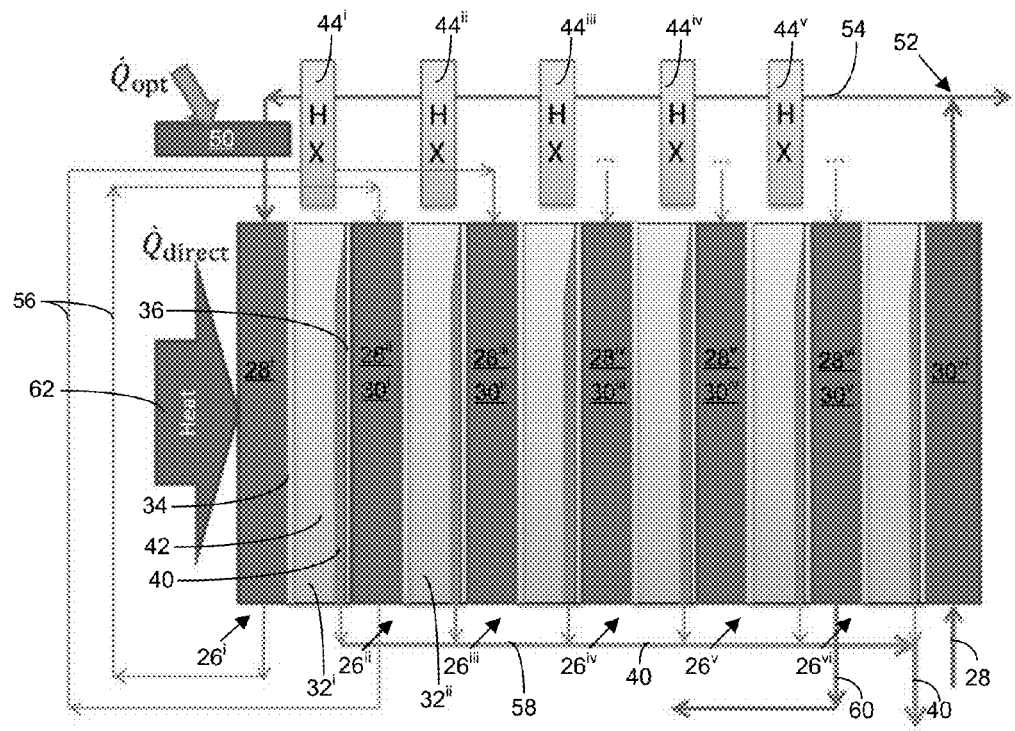
FIG. 6 is a schematic diagram of one embodiment of a multi-effect AGMD system with AGMD effects $26^{i}$-$26^{vi}$.

The overall thermal conductance of the gap 32 can also be increased by allowing the membrane 34 to be pressed onto the condensing surface 36, without any spacer 38 being used and with the resulting small gap 32 being filled with the condensed permeate (e.g., pure water) generated, wherein the membrane can dominate the thermal-conduction resistance between the liquid feed 28 and coolant 30 due to the small gap size. In operation, the effective gap size in such a case can be less than 0.1 mm or 0.05 mm in several parts and can be determined by the equilibrium position of the membrane 34, allowing the condensed permeate to flow out of the gap 32. The condensed permeate liquid 40 (e.g., pure water that passes through the membrane 34 from the liquid feed 28) can also serve as a spacer (filling the gap 32 and in contact with both the vapor-permeable membrane 34 and the heat-transfer surface 36), as shown in FIG. 5. This configuration is a multi-effect version of the permeate-gap membrane distillation (PGMD) system with stages $24^i$-$24^{vi}$. A multi-effect air-gap membrane distillation (AGMD) system is shown in FIG. 6. The amount of "air" 42, which may be ambient air or another gas composition, inside the gap 32 can be adjusted in order to actively control the permeate flux level. The air occupies a majority of the gap and is in contact with the gap-facing surface of the membrane 34, while the condensate permeate 40 can be primarily relegated to the other side of the gap along the condensing surface of the heat-transfer plate 36. In FIGS. 5 and 6, latter inter-stage feed-transfer conduits are omitted from the drawings to avoid clutter.

In particular embodiments, the thickness of the membrane 34 can be increased in some of the stages, e.g., by providing a double-layer membrane with a thick and highly porous support layer, to increase the heat-transfer resistance between feed 28 and the permeate 40 in the gap 32, especially at later effects where the feed salinity is higher. Similarly, thinner membranes can be used at the initial stages operating at high temperature and low feed salinity.

In the last stage (i.e., stage N—in these embodiments, the sixth stage $22^{vi}/24^{vi}/26^{vi}$), the source liquid feed 28 can be used as the coolant 30$^{vi}$; and an additional flow of liquid feed [in excess of what is passed through the heat exchangers (HX) 44] is passed through that coolant channel 48 to provide additional cooling and then removed at a split 52 in the feed-inlet conduit 54.

The liquid feed/brine is shown passing through the inter-stage heat exchangers (HX) $44^i$-$44^v$ via inter-stage conduits 56 connecting the output of one feed channel 46 with the input of the next-stage feed channel to preheat incoming liquid feed 28 in the Figures, where heat is exchanged between the feed inlet conduit 54 and inter-stage feed-transfer conduits 56 drawn inside each heat exchanger 44. Another embodiment, however, involves recovering energy from the warm permeate 40 produced in each effect, too, as the permeate 40 is extracted though a permeate-extraction conduit 58 in each effect and passed through a respective heat exchanger 44. The overall flow rate of permeate 40 extracted from the multi-stage apparatus is expressed as $\dot{m}_p$, while the flow rate of the brine 60 remaining from the liquid feed 28 exiting the final feed channel $28^{vi}$ is expressed as $\dot{m}_b$. In other embodiments, the heat exchangers 44 may be omitted. As shown FIGS. 4-7, heat 62 from a heat source is also added to the feed $28^i$ in the first-stage feed channel $46^i$ (e.g., heat can be supplied by condensing steam into the first stage).

Figure 7:
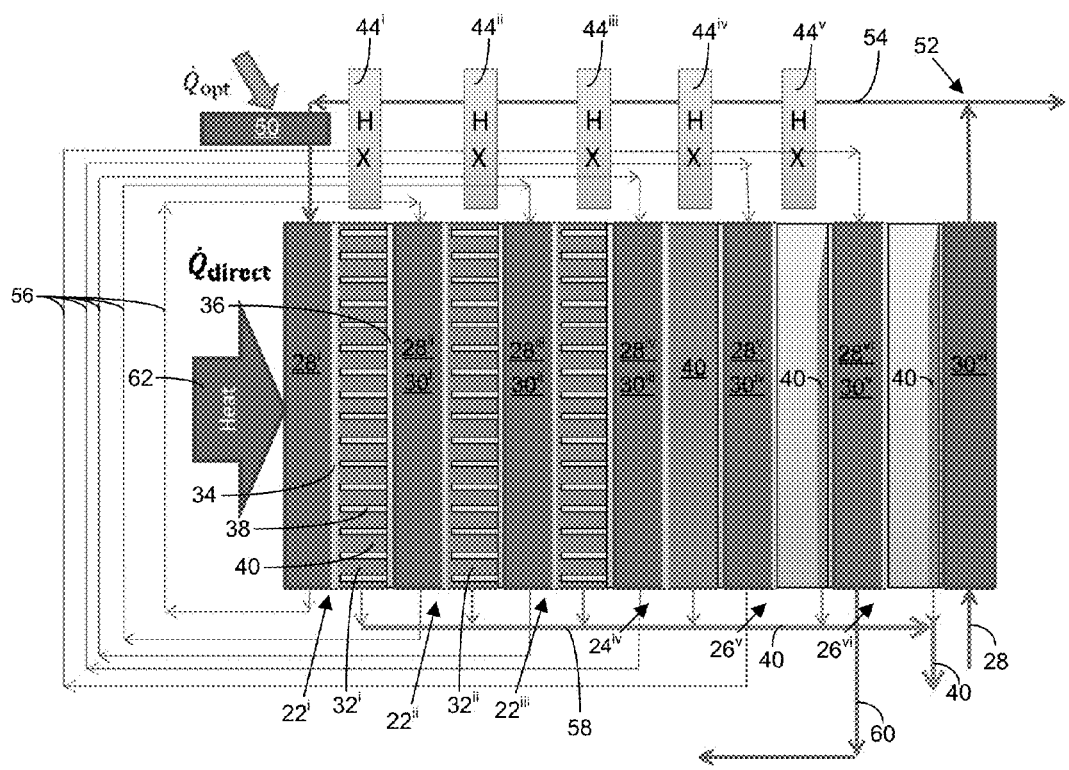
FIG. 7 is a schematic diagram of one embodiment of a multi-effect system with different types of effects (CGMD 22, PGMD 24, and AGMD 26) at the different stages.

The multi-effect embodiment of FIG. 7 includes a sequence of CGMD effects $22^i$-$22^{iii}$ as the first three effects, followed by a CGMD effect $24^{iv}$ and then two AGMD effects $26^v$ and $26^{vi}$. In other embodiments, a variety of other combinations and sequences of different effects 22/24/26 can be used, as can multiple membrane thicknesses be used at the various effects with all the gaps being configured as CGMD.

The condensation surface of the heat-transfer plate 36 in each stage (e.g., in an AGMD system) can also be super-hydrophobic (e.g., sufficiently hydrophobic to produce a contact angle with water of at least 150° and have a rugosity greater than 2), as described in Published US Application No. 2016/0107121 A1. In alternative embodiments, the condensation surface can be superhydrophilic. Additionally, in various embodiments, the condensate can be removed from the gap using grooves or other structures to remove condensate at intermediate positions in each stage to remove the condensate from the gaps more efficiently. The condensing surface can also be made of thin polymer materials such as polyester to further reduce capital costs. The recovery ratio (RR, where $$RR = \frac{\dot{m}_P}{\dot{m}_{refill}})$$

from the feed channel in each effect can be 2-15%.

Figure 8:
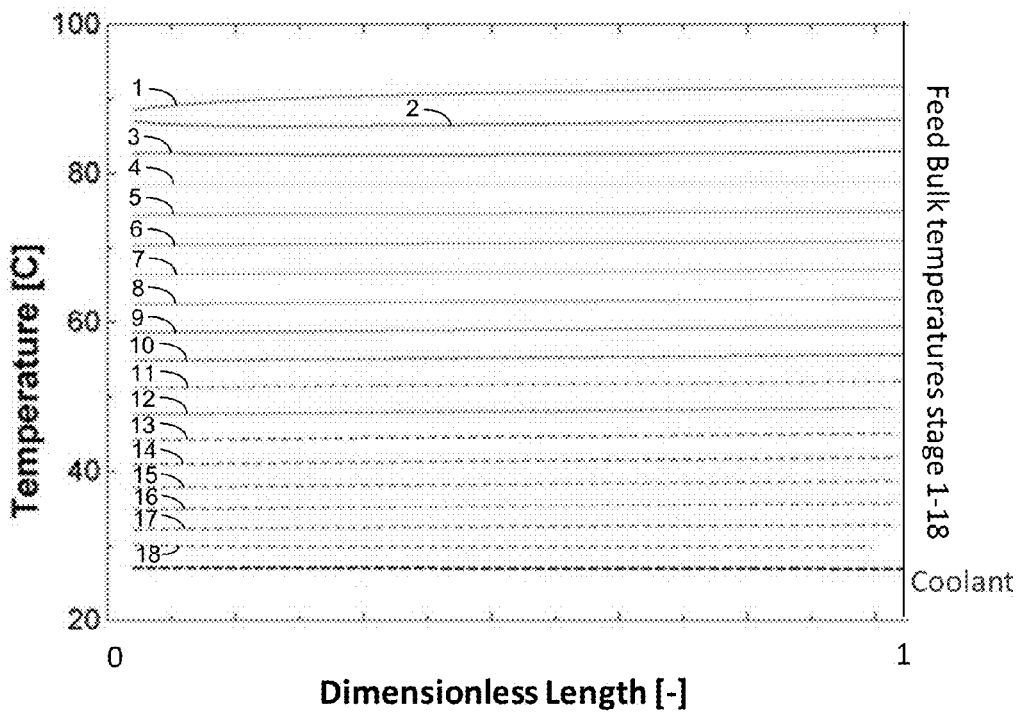
FIG. 8 plots the feed temperature profile for an 18-effect CGMD 22 system.

Experimental Results:

The number of effects can be varied over a wide range (e.g., between 3 and 40). From multi-effect distillation theory, the gained output ratio (GOR) is equal to or less than the total number of stages. The feed-temperature profile for an 18-effect CGMD system is shown in FIG. 8, wherein the temperature in each stage is labeled with the stage number from 1-18. The temperature in the feed channel 46 of each effect after the first effect can be, e.g., 2-20° C. cooler than the temperature in the feed channel 46 of the immediately preceding effect. The temperatures in the intermediate stages are automatically set during operation and vary based on the feed and cold-side temperatures and flow rates, $\dot{m}_{refill}$ and $\dot{m}_{f,in}$.

In the system of this embodiment, the temperature profiles are quite evenly distributed between the first and last effects. The temperature profile can be more evenly balanced by recovering energy from the permeate water 40, as well, in each inter-stage heat exchanger.

The number of stages in a practical system can be determined by economics, as each additional effect uses an additional heat exchanger. Economic analysis can be used to determine these trade-offs.

The present system eliminates the need for vacuum pumps or pressure chambers compared to commercial vacuum multi-effect MD systems; and, hence, the capital expenditure can be much lower.

Figure 9:
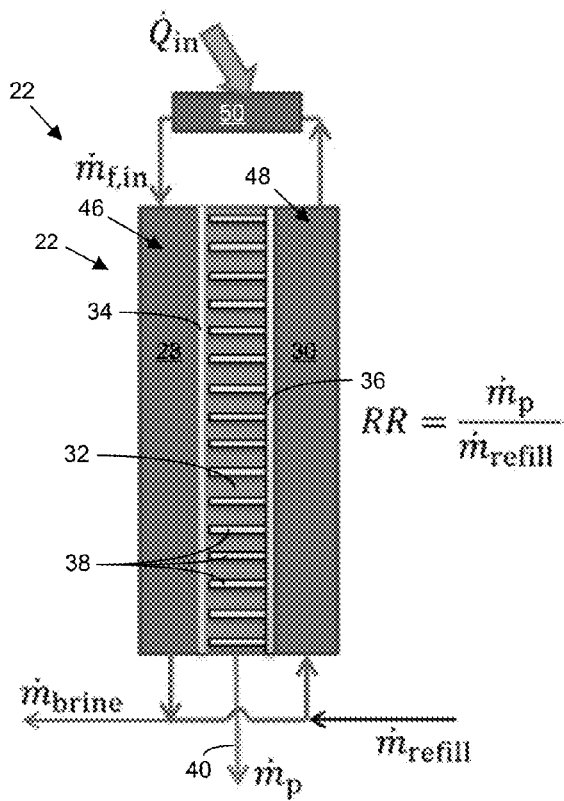
FIG. 9 shows the mass flow rates of liquids through a CGMD effect 22.

The results from the 18-effect CGMD system plotted in FIG. 8 are compared with those from a single-stage system of the same total membrane area with recirculation of liquids, as shown in FIG. 9, are provided in the following table. The flux is more than three times higher for the 18-effect CGMD system than the flux in the single-stage system for the same value of recovery ratio. At higher recovery ratios, the GOR of the single-stage system is also likely to be reduced.

| | Multi-Effect CGMD | Single-Stage CGMD with Recirculation |
|---|---|---|
| Gained Output Ratio (GOR) | 8.392 | 13.79 |
| Effective Recovery Ratio (RR) | 24.79% | 24.79% |
| Flux | 4.25 LMH | 1.274 LMH |
| Mass Flow Rate of Permeate ($\dot{m}_p$) | 0.1488 kg/s | 0.0446 kg/s |
| Mass Flow Rate of Input Feed ($\dot{m}_{f,in}$) | 0.6 kg/s | 0.6 kg/s |

Figure 10:
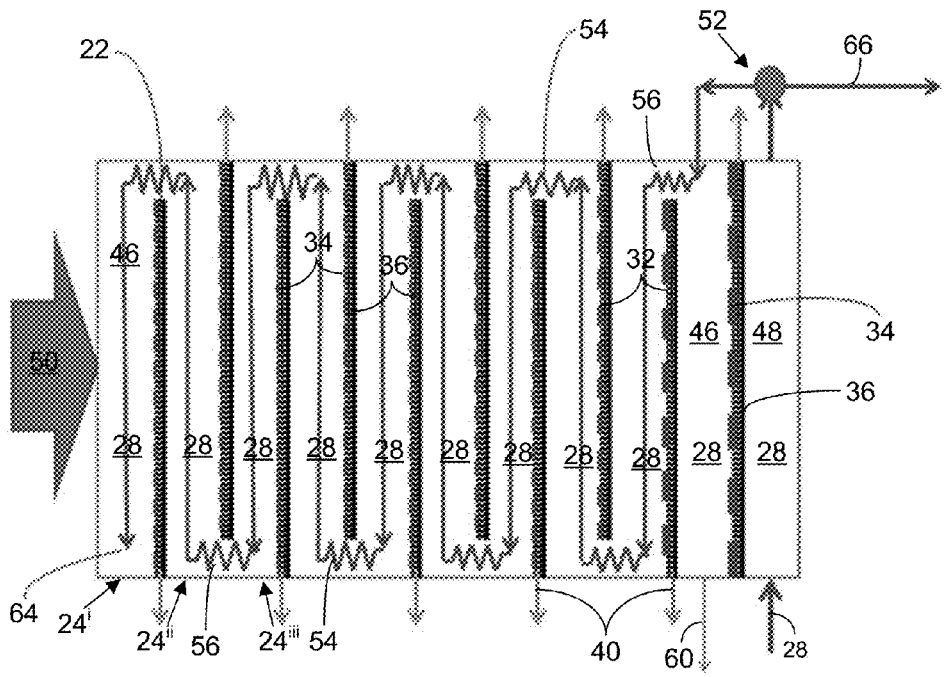
FIG. 10 is an illustration of a compact embodiment of a multi-effect CGMD system.
Figure 11:
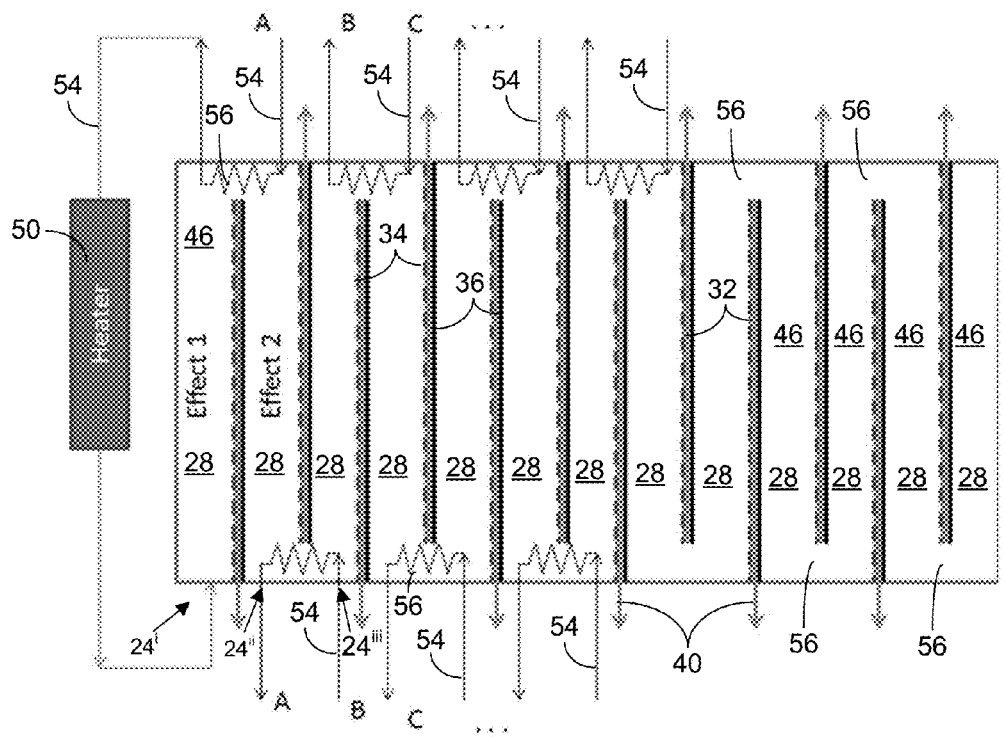
FIG. 11 is an illustration of another compact embodiment of a multi-effect CGMD system.

Additional embodiments of compact multi-effect CGMD systems are shown in FIGS. 10 and 11, wherein the gaps 32 (in which the liquid permeate collects) are very narrow and/or include with the non-porous heat-transfer plates 36 closely spaced apart from the membranes 34, optionally with conductive fins extending across the gap or with contact between the membranes 34 and the heat-transfer plates 36, in each effect 24 and inserted like baffles into the cuboidal module, and wherein the feed liquid 28 snakes through a serpentine feed channel 46 across the system. In each embodiment, the feed channels 46 are joined by inter-stage feed-transfer conduits 56 that are integral to the system, forming a continuous flow path; and the feed-inlet conduit 54 is passed through the inter-stage feed-transfer conduits 56 and/or the feed channel 46 to exchange heat from the feed liquid 28 in the inter-stage feed-transfer conduits 56 and/or the feed channels 46 to the incoming feed in feed-inlet conduit 54.

As shown in FIG. 10, the liquid feed 28 flows through a coolant channel 48 (at far right, as shown) through a final effect extending alongside and defined, in part, by the final heat-transfer plate 36. In the latter effects (toward the right), where the salinity of the remaining feed liquid 28 is higher, the membrane 34 can be thicker than the membrane 34 in previous effects (e.g., the membrane 34 can be a double-layer membrane in the latter effects) to reduce conduction heat loss, which can be a particular problem at higher feed salinities.

Likewise, the membrane thickness can be varied between the different effects in each of the other multi-stage embodiments described herein by, e.g., using thicker membranes at the later stages where the feed stream is more concentrated. This way, sensible heat conduction loss, which can be a significant problem at high feed salinity, can be reduced and overall energy efficiency can be improved. The following numerical modeling results show the advantage of using thicker membranes in some effects, wherein all three performance metrics can be improved simultaneously:

|  | GOR [—] | Overall Flux [LMH] | Recovery Ratio [—] |
| --- | --- | --- | --- |
| Feed salinity = 35 g/kg, L = 10 m, No. of stages = 12 | | | |
| 200 micron thick in all stages | 5.67 | 2.17 | 0.869 |
| thickness increasing in stages 7 onwards up to 400 um in the final stage | 6.19 | 2.22 | 0.889 |
| Feed salinity = 70 g/kg, L = 8 m, No. of stages = 6 | | | |
| 200 um in all stages | 3.52 | 4.79 | 0.766 |
| thickness increasing in stages 4 onwards up to 400 um in the final stage | 3.6 | 4.802 | 0.768 |

Returning to FIG. 10, after the liquid feed 28, acting as a coolant, flows through the coolant channel 48, excess feed liquid 66 can be recirculated by feed-inlet split 52 to combine with additional new liquid feed 28 entering the coolant channel 48. Meanwhile, the rest of the liquid feed 28 is directed by feed-inlet split 52 into the feed-inlet conduit 54, which snakes through serpentine pathway through the feed channels 46 in the direction shown by the arrows with contortions to provide increased heat exchange in the inter-stage feed-transfer conduits 56 extending between the feed channels 46. At the bottom of the first effect 24', at lower left, the liquid feed 28 is released from the feed-inlet conduit 54 to then flow back in the opposite direction through the feed channels 46 around the feed-inlet conduit 54 (releasing heat to the feed liquid 28 in the feed-inlet conduit 54) and in contact with the membranes 34 (through a vaporizable component of the liquid feed 28 permeates) and with the heat-transfer plates 36 (providing cooling to the heat-transfer plates 36) before being released as a final-stage brine 60 at lower right in FIG. 10.

In FIG. 11, points A are connected; points B are connected; and points C are connected, thereby providing a continuous flow of incoming feed liquid 28 through the through the inter-stage feed-transfer conduits 56 to cool the feed liquid 28 openly flowing in the opposite direction (at bottom and at top) about the inter-stage feed-transfer conduits 56 between the feed channels 28.

In describing embodiments of the invention, specific terminology is used for the sake of clarity. For the purpose of description, specific terms are intended to include at least technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3$rd, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A multi-effect membrane distillation system, comprising:
   a first membrane distillation effect, comprising (a) a first-stage feed channel with a first-stage feed inlet, (b) a first-stage gap, and (c) a first-stage vapor-permeable membrane separating the first-stage feed channel from the first-stage gap;
   a second membrane distillation effect, comprising (a) a second-stage feed channel with a second-stage feed inlet, (b) a second-stage gap, and (c) a second-stage vapor-permeable membrane separating the second-stage feed channel from the second-stage gap;

a heat-transfer plate separating the second-stage feed channel from the first-stage gap and configured to transfer heat therebetween;

a first feed-transfer conduit coupled with the first-stage feed channel and with the second-stage feed inlet and configured for flow of liquid feed from the first-stage feed inlet through the first-stage feed channel to the first feed-transfer conduit; and a second feed-transfer conduit coupled with the second-stage feed channel and configured for flow of liquid feed from the second-stage feed inlet through the second-stage feed channel to the second feed-transfer conduit, wherein at least one of the first membrane distillation effect and the second membrane distillation effect is selected from (a) a permeate-gap membrane distillation effect and (b) a conductive-gap membrane distillation effect with a thermally conductive spacer geometry that extends across the gap and improves the gap's effective thermal conductivity.

2. The multi-effect membrane distillation system of claim 1, further comprising a first heat source configured to heat liquid feed in the first-stage feed channel.

3. The multi-effect membrane distillation system of claim 2, further comprising a second heat source configured to heat liquid feed before it enters the first-stage feed channel.

4. The multi-effect membrane distillation system of claim 3, further comprising a first heat exchanger coupled with the feed inlet and with the first feed-transfer conduit and configured to transfer heat between the feed inlet and the first feed-transfer conduit, wherein the feed inlet is configured such that the liquid feed is passed through the first heat exchanger, then heated by the second heat source, and then passed through the first-stage feed channel.

5. The multi-effect membrane distillation system of claim 4, further comprising: at least one permeate-extraction conduit coupled with the first-stage and second-stage gaps and configured to extract permeate therefrom, wherein the at least one permeate-extraction conduit is also coupled with the first heat exchanger for heat transfer from the permeate-extraction conduit.

6. The multi-effect membrane distillation system of claim 1, further comprising a second heat exchanger coupled with the feed inlet and the second feed-transfer conduit and configured to transfer heat between liquid feed in the second feed-transfer conduit and liquid feed in the feed inlet.

7. The multi-effect membrane distillation system of claim 1, wherein the gaps comprise a vapor phase with a pressure within 10 percent of ambient atmospheric pressure.

8. The multi-effect membrane distillation system of claim 1, wherein the heat-transfer plate in at least one effect has a superhydrophillic or superhydrophobic surface facing the gap in that effect.

9. The multi-effect membrane distillation system of claim 1, further comprising a plurality of additional membrane distillation effects coupled to one another sequentially from the second membrane distillation effect.

10. The multi-effect membrane distillation system of claim 1, further comprising a substance substantially in liquid form in each of the first-stage and second-stage gaps.

11. The multi-effect membrane distillation system of claim 1, wherein the first-stage gap is at a pressure within 20% of a pressure in the first-stage feed channel.

12. The multi-effect membrane distillation system of claim 1, wherein the gap in at least one of the effects is a conductive gap.

13. The multi-effect membrane distillation system of claim 1, further comprising:

at least one additional membrane distillation effect, comprising (a) an additional-stage feed channel with an additional-stage feed inlet coupled directly with or downstream from the second feed-transfer conduit, (b) an additional-stage gap, and (c) an additional-stage vapor-permeable membrane separating the additional-stage feed channel from the additional-stage gap; and a heat-transfer plate separating the additional-stage feed channel from the second-stage gap or from a preceding additional-stage gap and configured to transfer heat therebetween.

14. The multi-effect membrane distillation system of claim 13, further comprising:

a final effect, comprising (a) a final-stage feed channel with a feed inlet coupled with a feed-liquid source; (b) a final-stage gap; and (c) a final-stage vapor-permeable membrane separating the additional-stage feed channel from the additional-stage gap; and a heat-transfer plate separating the additional-stage feed channel from the second-stage gap or from a preceding additional-stage gap and configured to transfer heat therebetween.

15. The multi-effect membrane distillation system of claim 1, further comprising: at least one permeate-extraction conduit coupled with the first-stage and second-stage gaps and configured to extract permeate therefrom.

16. A multi-effect membrane distillation system, comprising:

a first membrane distillation effect, comprising (a) a first-stage feed channel with a first-stage feed inlet, (b) a first-stage gap, and (c) a first-stage vapor-permeable membrane separating the first-stage feed channel from the first-stage gap;

a second membrane distillation effect, comprising (a) a second-stage feed channel with a second-stage feed inlet, (b) a second-stage gap, and (c) a second-stage vapor-permeable membrane separating the second-stage feed channel from the second-stage gap;

a heat-transfer plate separating the second-stage feed channel from the first-stage gap and configured to transfer heat therebetween;

a first feed-transfer conduit coupled with the first-stage feed channel and with the second-stage feed inlet and configured for flow of liquid feed from the frst-stage feed inlet through the first-stage feed channel to the first feed-transfer conduit; and a second feed-transfer conduit coupled with the second-stage feed channel and configured for flow of liquid feed from the second-stage feed inlet through the second-stage feed channel to the second feed-transfer conduit, wherein the membrane distillation effects are selected from conductive-gap, air-gap, and permeate-gap membrane distillation effects, and wherein at least one of the membrane distillation effects is a different type of membrane distillation effect than another of the membrane distillation effects.

17. A multi-effect membrane distillation system, comprising:

a first membrane distillation effect, comprising (a) a first-stage feed channel with a first-stage feed inlet, (b) a first-stage gap, and (c) a first-stage vapor-permeable membrane separating the first-stage feed channel from the first-stage gap;

a second membrane distillation effect, comprising (a) a second-stage feed channel with a second-stage feed inlet, (b) a second-stage gap, and (c) a second-stage vapor-permeable membrane separating the second-stage feed channel from the second-stage gap;

a heat-transfer plate separating the second-stage feed channel from the first-stage gap and configured to transfer heat therebetween;

a first feed-transfer conduit coupled with the first-stage feed channel and with the second-stage feed inlet and configured for flow of liquid feed from the frst-stage feed inlet through the first-stage feed channel to the first feed-transfer conduit; and a second feed-transfer conduit coupled with the second-stage feed channel and configured for flow of liquid feed from the second-stage feed inlet through the second-stage feed channel to the second feed-transfer conduit, wherein the gap between the vapor-permeable membrane and the heat-transfer plate in at least one of the effects is less than 0.1 mm.

18. A multi-effect membrane distillation system, comprising:

a first membrane distillation effect, comprising (a) a first-stage feed channel with a first-stage feed inlet, (b) a first-stage gap, and (c) a first-stage vapor-permeable membrane separating the first-stage feed channel from the first-stage gap;

a second membrane distillation effect, comprising (a) a second-stage feed channel with a second-stage feed inlet, (b) a second-stage gap, and (c) a second-stage vapor-permeable membrane separating the second-stage feed channel from the second-stage gap;

a heat-transfer plate separating the second-stage feed channel from the first-stage gap and configured to transfer heat therebetween;

a first feed-transfer conduit coupled with the first-stage feed channel and with the second-stage feed inlet and configured for flow of liquid feed from the first-stage feed inlet through the first-stage feed channel to the first feed-transfer conduit; and a second feed-transfer conduit coupled with the second-stage feed channel and configured for flow of liquid feed from the second-stage feed inlet through the second-stage feed channel to the second feed-transfer conduit, wherein at least one of the vapor-permeable membranes has a different thickness than other membranes and is a function of the temperature and feed salinity conditions of the effect.

19. A method for multi-effect membrane distillation, comprising:

utilizing a multi-effect membrane distillation system, comprising:

a) a first membrane distillation effect, comprising (i) a first-stage feed channel with a first-stage feed inlet, (ii) a first-stage gap, and (iii) a first-stage vapor-permeable membrane separating the first-stage feed channel from the first-stage gap;

b) a second membrane distillation effect, comprising (i) a second-stage feed channel with a second-stage feed inlet, (ii) a second-stage gap, and (iii) a second-stage vapor-permeable membrane separating the second-stage feed channel from the second-stage gap, wherein at least one of the first membrane distillation effect and the second membrane distillation effect is selected from (a) a permeate-gap membrane distillation effect and (b) a conductive-gap membrane distillation effect with a thermally conductive spacer geometry that extends across the gap and improves the gap's effective thermal conductivity;

c) a heat-transfer plate separating the second-stage feed channel from the first-stage gap and configured to transfer heat therebetween;

d) a first feed-transfer conduit coupled with the first-stage feed channel and with the second-stage feed inlet and configured for flow of liquid feed from the frst-stage feed inlet through the first-stage feed channel to the first feed-transfer conduit; and e) a second feed-transfer conduit coupled with the second-stage feed channel and configured for flow of liquid feed from the second-stage feed inlet through the second-stage feed channel to the second feed-transfer conduit;

flowing a liquid feed from the feed inlet and first feed-transfer conduit through the feed channels;

vaporizing a component of the liquid feed through the vapor-permeable membranes into the gaps in each effect; and condensing the vaporized component in the gaps.

20. The method of claim 19, wherein the vaporized and condensed component is water.

21. The method of claim 19, wherein liquid feed in the second-stage feed channel is at a lower temperature than liquid feed in the first-stage feed channel.

22. The method of claim 21, wherein liquid feed in the second-stage feed channel is 2 to 20° C. cooler than liquid feed in the first-stage feed channel.

23. The method of claim 22, wherein the liquid feed is fed through additional feed channels positioned downstream, in sequence, from the second-stage feed channel and wherein liquid feed in each subsequent feed channel is 2 to 20° C. cooler than liquid feed in the preceding feed channel.

24. The method of claim 23, wherein the liquid feed is fed through a coolant channel adjacent to the gap in a final effect.

25. The method of claim 24, wherein additional liquid feed is passed through the coolant channel and then removed from the distillation system without passing through any other effects.

26. The method of claim 19, wherein a recovery ratio from the first-stage feed channel is 2 to 15%, and wherein a recovery ratio from the second-stage feed channel is 2 to 15%.

27. The method of claim 19, wherein a surface of each vapor-permeable membrane facing its respective gap is (a) in contact with the condensed vapor component in the respective gap, (b) in contact with a gas phase in the respective gap, and (c) in contact with a thermally conductive spacer extending across the gap between the vapor-permeable membrane and the heat-transfer plate, wherein each gap is distillate filled.

28. The method of claim 19, wherein the gap between the vapor-permeable membrane and the heat-transfer plate in at least one of the effects is less than 0.1 mm and is filled with condensate extending across the entire width of the gap from the vapor-permeable membrane and the heat-transfer plate.

* * * * *